(12) United States Patent
Moskob

(10) Patent No.: US 6,528,915 B1
(45) Date of Patent: Mar. 4, 2003

(54) ACTUATING DRIVE WITH AN ELECTRIC MOTOR AND CONTROL ELECTRONICS

(75) Inventor: Frank Moskob, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,133

(22) PCT Filed: May 29, 1999

(86) PCT No.: PCT/DE99/01588

§ 371 (c)(1),
(2), (4) Date: Oct. 27, 2000

(87) PCT Pub. No.: WO00/38300

PCT Pub. Date: Jun. 29, 2000

(30) Foreign Application Priority Data

Dec. 18, 1998 (DE) .......................... 198 58 627

(51) Int. Cl.⁷ .......................... H02K 11/00; H01R 4/66
(52) U.S. Cl. .................. 310/71; 310/DIG. 6; 439/95
(58) Field of Search .................. 310/68 AR, 71, 310/DIG. 6, 89, 239; 439/95, 96, 101, 103, 108, 350; 361/816, 818

(56) References Cited

U.S. PATENT DOCUMENTS

| | | | | |
|---|---|---|---|---|
| 4,384,223 A | * | 5/1983 | Zelt .......................... 310/68 R |
| 4,728,835 A | * | 3/1988 | Baines .......................... 310/71 |
| 5,196,750 A | * | 3/1993 | Strobl .......................... 310/239 |
| 5,219,305 A | * | 6/1993 | Kawaguchi et al. ........ 439/620 |
| 5,334,897 A | * | 8/1994 | Ineson et al. .................. 310/89 |
| 5,598,045 A | * | 1/1997 | Ohtake et al. ........ 310/40 MM |
| 5,603,620 A | * | 2/1997 | Hinze et al. .................. 439/95 |
| 5,619,084 A | * | 4/1997 | Lau ............................ 310/154 |
| 6,037,693 A | * | 3/2000 | Marth et al. ................ 310/220 |
| 6,232,684 B1 | * | 5/2000 | Haag et al. ............... 310/68 R |

FOREIGN PATENT DOCUMENTS

| | | |
|---|---|---|
| DE | 4242641 A1 | * 6/1994 |
| EP | 0509683 A2 | * 10/1992 |

* cited by examiner

Primary Examiner—Dang Dinh Le
(74) Attorney, Agent, or Firm—Ronald E. Greigg

(57) ABSTRACT

An actuating drive with an electric motor that has a metallic electric motor housing, a shaft, an armature, collector, brushes, and a brush holder plate, and control electronics. Electronic and electric components are connected to a printed circuit board and the printed circuit board protrudes at right angles to the shaft and into a cross section of the electric motor housing. Outside the electric motor housing, the electronic and electric components are protected by a control electronics housing. Radio interference suppression means, for example, can be disposed inside the actuating drive. The system includes a printed circuit board with a strip conductor and a contact spring that leads from the strip conductor and this contact spring protrudes into the electric motor housing, wherein a resilient free end of the spring rests against the electric motor housing producing an electrical contact.

11 Claims, 4 Drawing Sheets

ACTUATING DRIVE WITH AN ELECTRIC MOTOR AND CONTROL ELECTRONICS

PRIOR ART

The invention is based on an actuating drive with an electric motor and control electronics.

By means of the references U.S. Pat. No. 4,384,223, DE 33 14 412 C2, and DE 196 54 352 A1, it is widely known to dispose electrical interference suppression means inside metallic electric motor housings, adjacent to the collectors and associated brushes of so-called collector motors, and to connect these interference suppression means to the brushes and also to the metallic electric motor housings. In order to connect the interference suppression means to the metallic electric motor housings, resilient tabs protrude from so-called brush holder plates that support the brush holders and these tabs can, for example, be embodied at their free ends in the form of tapering claws. This has the advantage that a favorable electrical contact is produced, for example through the production of scoring tracks due to relative movements of these claws in relation to the electric motor housing during assembly. In an interference suppression circuit disclosed by the U.S. reference U.S. Pat. No. 4,384,223, capacitors are used as interference suppression means. In this instance, two capacitors are connected in series and the contact disposed in the electric motor housing is connected to both capacitors. The respective other connection of each of the capacitors is respectively connected to one of the brushes. An interference suppression circuit of this kind is also known by the name "Cy interference suppression circuit". In contrast, in the examples according to DE 33 14 412 C2 and DE 196 54 352 A1, a brush connected to an interference suppression circuit is electrically connected to the electric motor housing in as low-ohm a fashion as possible according to the method "Masse des Electromotorgehäuses an einem Pol des Gleichspannungsnetzes" [Grounding the Electric Motor Housing to a Pole of the Direct Current Network], wherein the direct current network can be the electrical system of a vehicle. In such a connection of the electric motor housing to a brush, there is most often the limitation that the electric motor can only be operated in one rotation direction, which is sufficient, though, in a pump drive motor for a piston pump, for example of a hydraulic vehicle brake system or a windshield wiper drive motor.

The reference DE 42 42 641 A1 has disclosed an actuating drive with an electric motor that has a metallic electric motor housing. A shaft with an armature and collector, as well as brushes and a brush holder plate, and with control electronics for the electric motor. The electronic and electric components are connected to a printed circuit board and the printed circuit board protrudes at right angles to the shaft and, adjacent to the brush holders, protrudes into a cross section of the electric motor housing, and outside the electric motor housing, is protected by a control electronics housing. The actuating drive has, for example, a worm drive and is used, for example, to move a sliding sunroof. Accordingly, the electric motor must operate in two different rotation directions, which is achieved by means of the control electronics. The control electronics are also set up in such a way that the sliding sunroof mentioned above can also assume selectable intermediary positions between structurally possible end positions. The electric motor is switched off in the end positions. Because this electric motor has a collector and brushes, it can be necessary to provide an interference suppression circuit in the actuating drive, for example of a type used in the prior art. The interference suppression means can be added, for example, to the control electronics and can be fastened, for example, to the printed circuit board.

ADVANTAGES OF THE INVENTION

The actuating drive according to the invention, with an electric motor and control electronics, has the advantage that during assembly of the electric motor, which includes the sliding together of the electric motor housing and the brush carrying plate through the addition of the printed circuit board, the metallic electric motor housing can be connected in an electrically conductive manner to an interference suppression circuit, for example embodied as a Cy circuit whose interference suppression means are contacted by the printed circuit board of the control electronics.

Advantageous improvements and updates of the actuating drive are possible by means of the measures taken hereinafter.

The actuating drive has the advantage that the printed circuit board can take up a relatively large amount of space inside the electric motor housing because only one cutout is needed per se in the printed circuit board in order for the thinnest rotating component of the electric motor, namely the shaft, not to collide with the printed circuit board.

The features set forth herein produce a favorable anchoring of the contact spring, installed according to the invention, in an otherwise normally provided brush carrying plate. After the installation of the brush carrying plate, the printed circuit board can be aligned in relation to the shaft, moved along this shaft toward the brush carrying plate, and mounted, wherein a contact tab then protrudes through an opening in the printed circuit board in order to be soldered to an associated strip conductor.

Other features set forth herein disclose an alternative embodiment to the embodying means set forth above. The featured opening in the brush carrying plate can be produced by means of a relatively simply embodied tool, and thus the contact spring is inserted into this opening in a subsequent assembly step.

Still another feature produces the advantage that after being inserted into the opening, the contact spring is secured in the axial direction in a positively engaging fashion.

Yet another feature produces the advantage that even before the assembly of the actuating drive, the contact spring can be connected to the printed circuit board and soldered to a strip conductor. In this respect, the soldering can be carried out at the same time as the production of other required soldered connections of the control electronics.

In lieu of the relatively narrow openings in the brush carrying plates mentioned in the preceding exemplary embodiments, the brush carrying plate is now given a relatively large opening through which the contact spring can be introduced into the electric motor housing, for example in a contactless manner.

While still another feature produces a favorable anchoring of the contact spring to the printed circuit board so that the desired contact force that acts in a tilting fashion on the contact spring does not lead to detachment from the printed circuit board.

Other features produce the advantage that during assembly of the electric motor, the resilient end of the contact spring that produces the contact does not stick out during the passage through the brush carrying plate and during insertion into the electric motor housing, as a result of which the insertion of the contact spring can be carried out.

Yet another features produce the advantage that before and during assembly of the electric motor, the contact spring is largely protected from damage or from bending that would impair the production of contact.

Other features set forth produces the advantage that for example when the contact spring is fastened in a tilt-free manner to the printed circuit board, the resilient free end is sufficiently pressed against the electric motor housing. The starting ramp achieves the fact that toward the end of the insertion of the contact spring into the electric motor housing, the freely resilient end is moved into the contact position in a radial direction in relation to the electric motor housing.

BRIEF DESCRIPTION OF THE DRAWINGS

Three exemplary embodiments of the actuating drive according to the invention will be described in detail below and are shown in the drawings.

DESCRIPTION OF THE EXEMPLARY EMBODIMENTS

Figure 1:
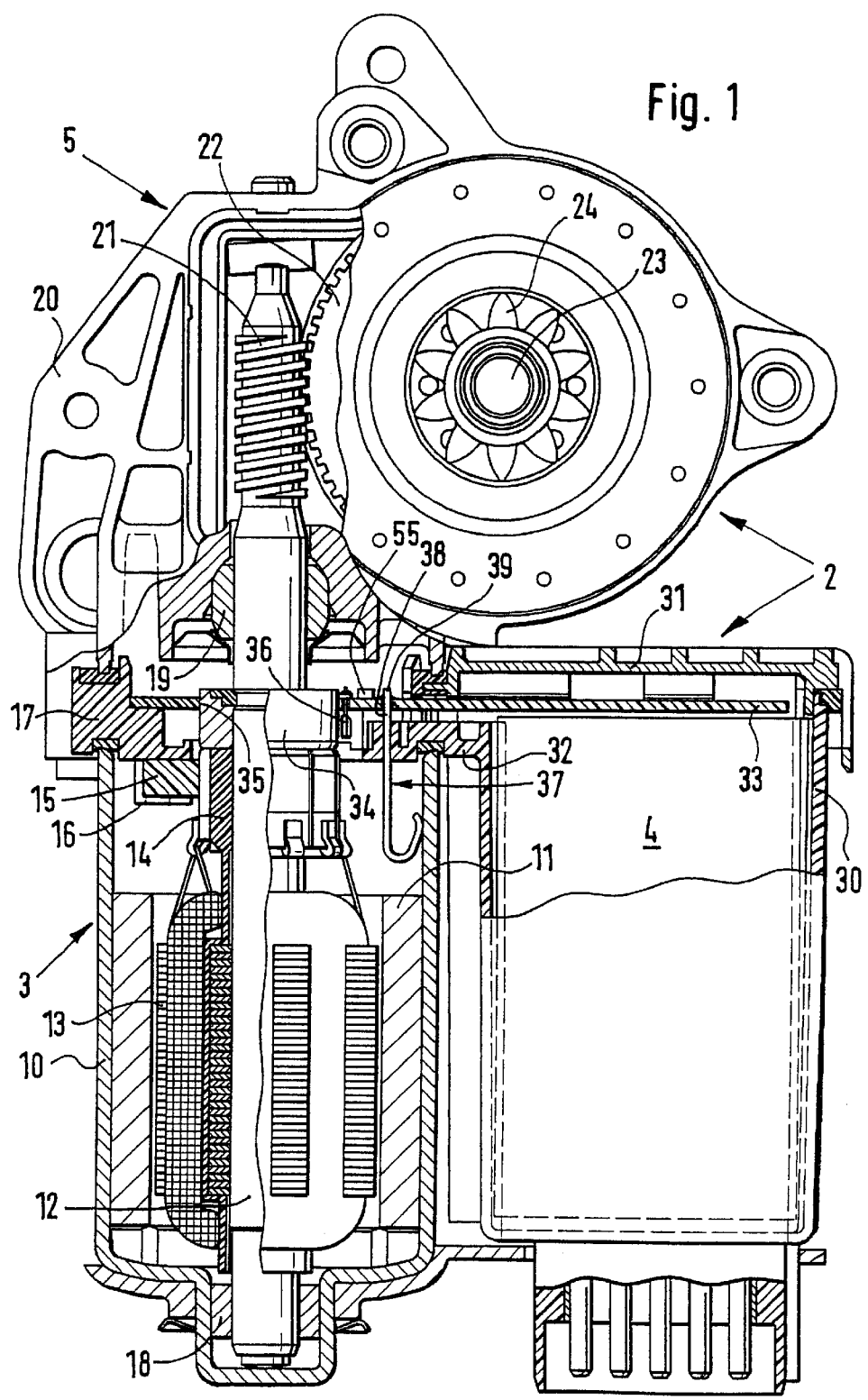
FIG. 1 shows a longitudinal section through a first exemplary embodiment.

The actuating drive 2 according to the invention in FIG. 1 has an electric motor 3, control electronics 4, and a mechanical transmission 5 subordinate to the electric motor.

The electric motor 3 has an electric motor housing 10 essentially embodied in a cup shape and permanent magnets 11 disposed in the housing in a stationary fashion, an armature 13 is supported by a shaft 12 inside the permanent magnets 11, a collector 14 associated with the armature 13, two brushes 15 that can be pressed against the collector 14 in an intrinsically known manner, brush holders 16 associated with the brushes 15, a brush holder plate 17 that supports the brush holders 16, as well as a first shaft bearing 18 and a second shaft bearing 19. In this connection, the brush holder plate 16 axially adjoins the cup-like electric motor housing 10 via and the brush holder plate 17 which is in turn axially adjoined to the motor housing by the mechanical transmission 5 whose housing 20 acts as a cover for the electric motor 3 and in this instance, receives the second bearing shaft 19 in a tilting manner.

The shaft 12 extends through the second shaft bearing 19 into a worm shaft 21 that extends into the housing 20. This worm shaft 21 meshes with a worm gear 22 that is supported by means of a worm gear shaft 23. This worm gear shaft 23 drives a pinion 24 disposed outside the housing 20. For example, the pinion 24 is used to move a sliding sunroof by means of a flexible pulling and pushing means that is not shown. However, the pinion can also be used to move a power-window unit. It is clear that the transmission 5 can move different objects and therefore a different drive element can be connected to the worm gear shaft 23 instead of the pinion 24.

The control electronics 4 are protected by a control electronics protective housing 30, wherein adjacent to the mechanical transmission 5, a protective housing cover 31 is associated with the control electronics protective housing 30. In the example, the control electronics protective housing 30 is connected by means of a bridge 32 to the brush carrying plate 17 to form an integral component with the brush carrying plate. Along this bridge 30, the control electronics 4 have a printed circuit board 33. This printed circuit board 33 is aligned with its plane at right angles to the shaft 12 and has an opening 35 so that the shaft 12 and a rotationally symmetrical permanent magnet body 34, which is glued to the shaft 12 in a non-rotating fashion, can rotate inside the outline of the printed circuit board 33. This opening 35 encompasses the permanent magnet body 34 with radial play. A Hall sensor 36 is positioned adjacent to the circumference of the permanent magnet body 34, which in an intrinsically known fashion can have a north pole and a south pole on its circumference, and this Hall sensor 36 is fastened to the printed circuit board 33 by means of its connecting wires that are not shown. This Hall sensor 36 is part of the control electronics 4. The connecting wires of the Hall sensor 36, of which there are usually three, are connected in a manner not shown via conductor strips not shown that are disposed on the printed circuit board 33, to electric and electronic components not shown. Since the control electronics 4 are not the subject of the patent application, no further information is required.

Radio interference suppression means 55, which correspond for example to the capacitor connection according to the U.S. reference U.S. Pat. No. 4,384,223, are fastened in the vicinity of the control electronics 4 and thereby to the printed circuit board 33, for example. At least two capacitors are thus combined in a so-called Cy interference suppression circuit and two capacitor connecting means are electrically associated with the two brushes 16. A so-called center tapping of the capacitor combination is provided in order to contact the metallic electric motor housing 10. To this end, in the exemplary embodiment according to FIG. 1 and the enlarged depiction in FIG. 2, a contact spring 37 is disposed in the brush carrying plate 17 made of thermoplastic material, by means of injection molding around this contact spring 37. On an end 38 that reaches toward the printed circuit board 33, the contact spring 37 has a soldering tab 39 which protrudes through an opening 40 that can be seen better in FIG. 2 and thereby also protrudes through a strip conductor 41 in order to contact the strip conductor 41 through the production of a solder connection 42. This strip conductor 41 is in turn electrically connected to the above-described radio interference suppression means 55. In this connection, the radio interference suppression means 55 can be embodied using the SMD technique, wherein the abbreviation SMD stands for "surface mounted device" and thus signifies mounting onto the surface of the printed circuit board 33 and conductor strip 41.

Figure 2:
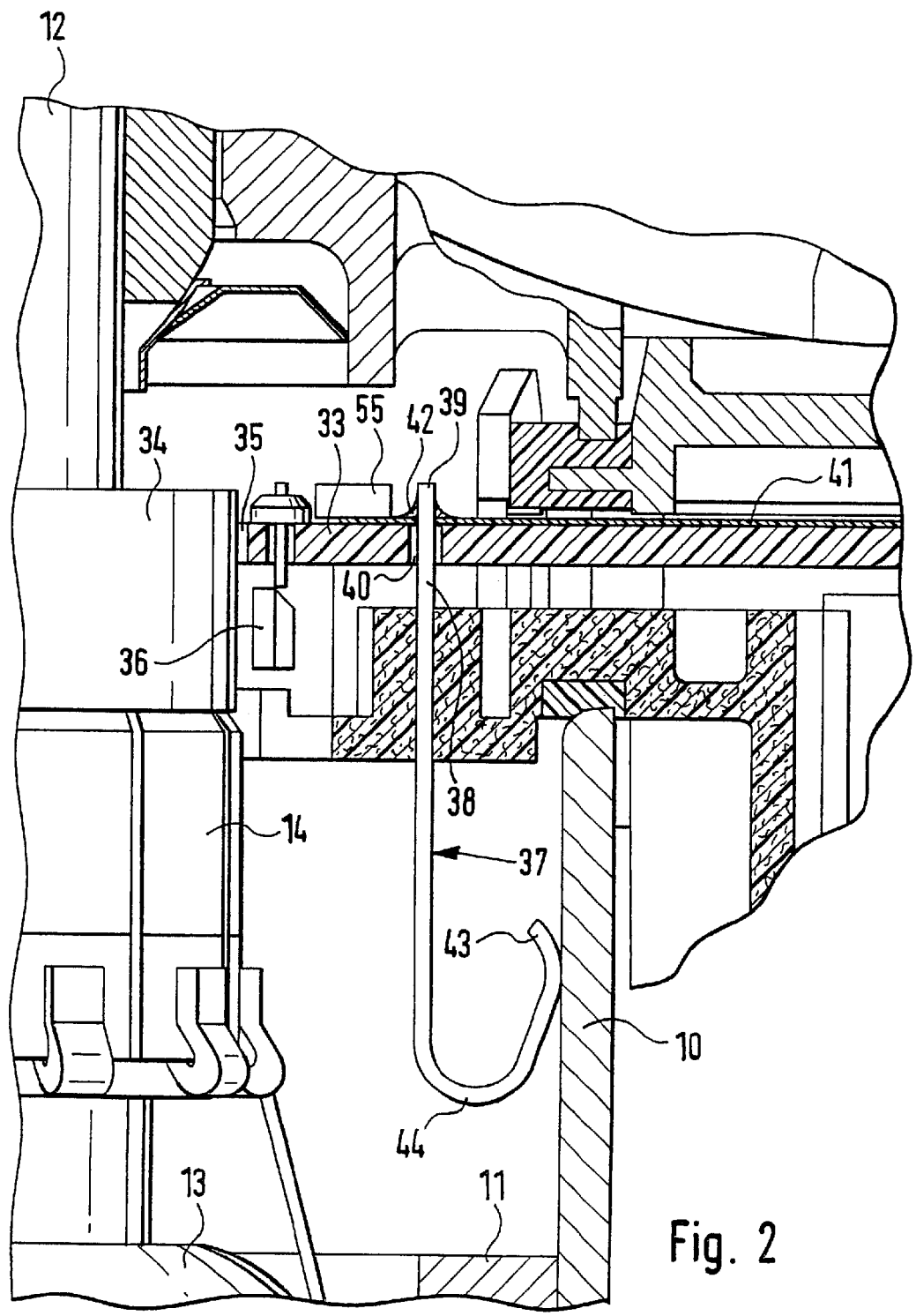
FIG. 2 shows the detail according to the invention in FIG. 1, in an enlarged scale.

As can be seen in FIGS. 1 and 2, the contact spring 37 extends from the printed circuit board 33, for example parallel to the shaft 12, into the metallic electric motor housing 10. Inside the electric motor housing 10, the contact spring 37 has a resilient end 43 which, by means of a curved section 44 with a curvature of essentially 150° in the installed position, is connected to the printed circuit board 33 via an end 38 that constitutes a spring foot. So that in the state depicted, the resilient end 43 has sufficient contact force against the electric motor housing 10, the curved section 44 is given an initial curvature that is 20° more acute than the one shown, for example.

As can be seen from FIG. 1, as a result of the cup-like embodiment of the electric motor housing 10 and the brush holder plate 17, an axial assembly is provided. In the example of FIG. 1, the combination of the armature 13 and the collector 14 with the associated longitudinal section of the shaft 12 is slid into the electric motor housing 10 which causes the shaft 12 to reach into the first bearing 18. Then, for example, the combination made up of the brush holder plate 17 and the control electronics protective housing 30 is aligned in relation to the electric motor housing 10 and moved along the worm shaft 21 toward electric motor housing 10. In so doing, the contact spring 37 is inserted into the electric motor housing 10 whereby through elastic deformation, for example in the vicinity of the curved section 44, the resilient end 43 properly produces the contact with the metallic electric motor housing 10. As a result, the control electronics 4 can alternatively be already built into the control electronics housing 30 and in addition, the printed circuit board 33 can already be connected to the brush holder plate 17. This has the advantage that even before the connection of the brush holder plate 17 with the electric motor housing 10, the soldering tab 39 of the contact spring 37 can be soldered to the above-described conductor strip 41. As has been mentioned previously in the introduction to the specification, this soldering can take place, for example, simultaneously with the production of the other solder connections, for example with the solder connection that produces the retention and the electrical contact of the Hall sensor 36 with the printed circuit board 33. Then the mechanical transmission 5 and the second shaft bearing 19 that is tiltably disposed in it are aligned in relation to the worm shaft 21 and finally are axially mounted onto the brush carrying plate 17, forming the cover.

Figure 3:
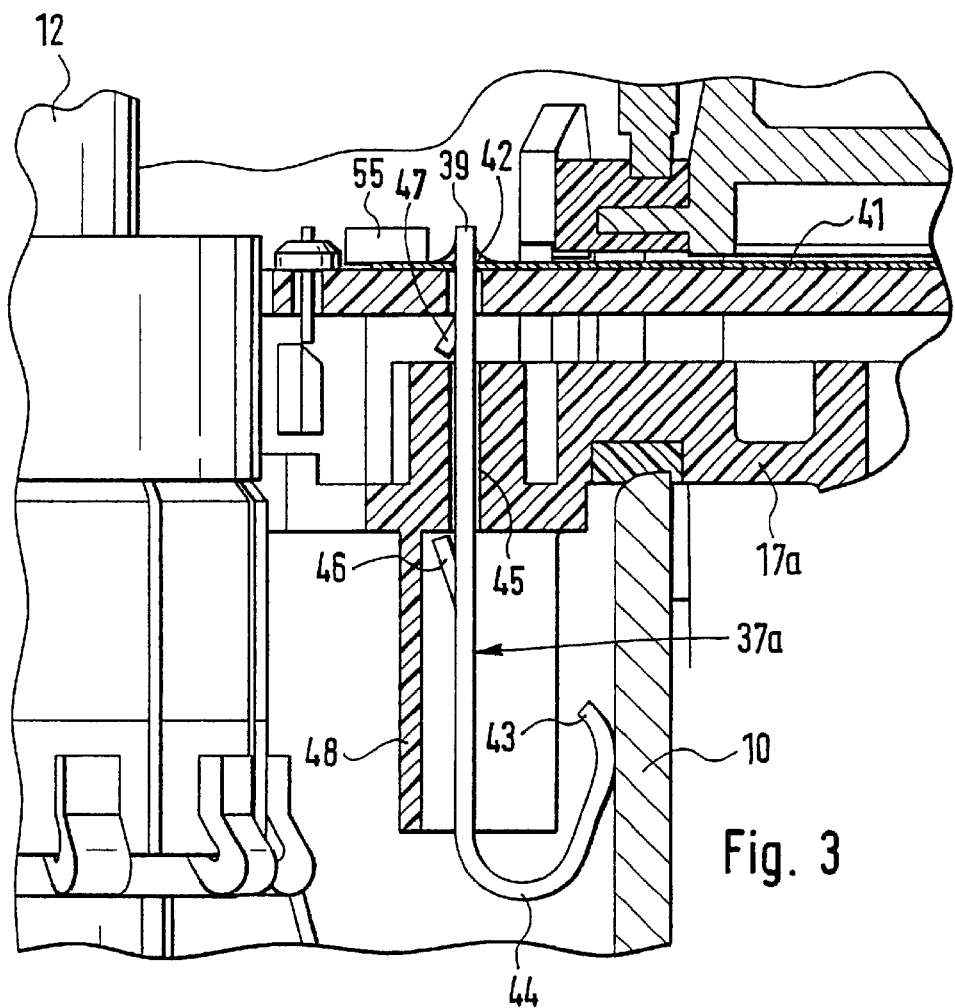
FIG. 3 shows an alternative detail in an enlarged scale.
Figure 4:
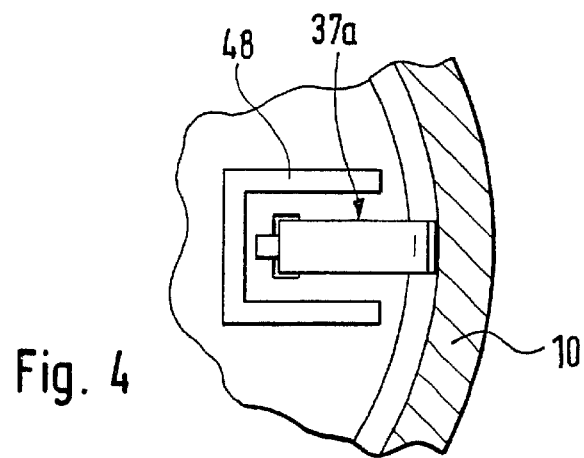
FIG. 4 shows an end view of the exemplary embodiment according to FIG. 3.

The second exemplary embodiment according to FIGS. 3 and 4 differs from the exemplary embodiment according to FIGS. 1 and 2 by virtue of the fact that a positively engaging, materially adhesive injection molding of the contact spring 37 is eliminated. In contrast, a conduit 45 is simply provided in a modified brush carrying plate 17a. A contact spring 37a that is modified through the addition of two resilient tabs 46 and 47 is slid through this conduit 45. The securing tabs 46 and 47 are made out of the material of the contact spring 37a and can be formed by producing U-shaped slits and bending material out from the contour of the contact spring 37a. Since the insertion of the contact spring 37a into the conduit 45 with the soldering tabs 39 takes place ahead of time, the securing tab 46 can already protrude out from the contour of the contact spring 37a as shown in FIG. 3. There are two possibilities for the securing tab 47. The first possibility is comprised of allowing the resilient tab 47 to already protrude from the contact spring 37a before the insertion of the contact spring 37a so that during the insertion, the securing tab 47 is pressed back elastically into the contour of the contact spring 37a and then snaps into the securing position shown in FIG. 3. The second possibility is comprised of producing the bending-out of the securing tab 47 shown in FIG. 3 after the contact spring 37 is inserted into the conduit 45.

In contrast to the first exemplary embodiment in FIGS. 1 and 2, a protective wall 48 is also provided in order to prevent the contact spring 37 from disadvantageously bending before or during assembly. This protective wall 48 protrudes from the brush carrying plate 17a, has an essentially U-shaped outline that opens radially outward toward the electric motor housing 10 and thereby extends, for example, parallel to the shaft 12.

Figure 5:
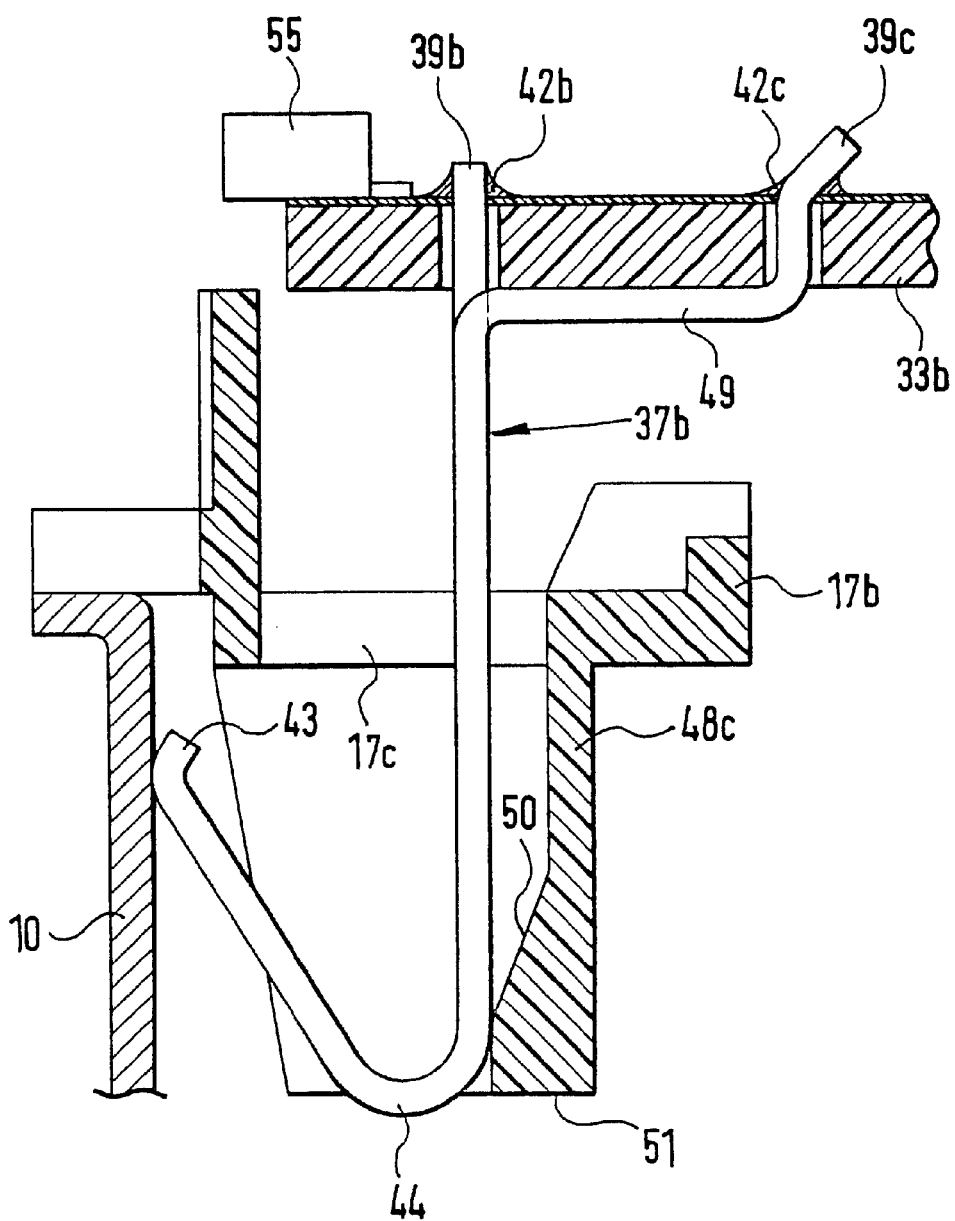
FIG. 5 shows the third exemplary embodiment in an enlarged scale.

The third exemplary embodiment according to FIG. 5 saves a fastening to the brush carrying plate 17 or 17a by virtue of the fact that a contact spring 37b is fastened in a tilt-free fashion to a differently embodied printed circuit board 33b. To this end, the contact spring 37b has at least two soldering tabs 39b and 39c that can be slid through the printed circuit board 33b. The soldering tabs 39b and 39c are spaced apart so that soldering points 42b and 42c can withstand a tilting of the contact spring 37b as a result of contact pressure against a lever arm. The two spaced-apart soldering tabs 39b and 39c can be produced by slitting a band material from which the contact spring 37b is produced for a certain distance longitudinally so that at least two strips are produced, wherein one strip 49 is bent at an angle and then positioned extending along the plane of the printed circuit board 33b. The soldering tab 39c adjoins this strip 49.

The brush carrying plate 17b has an opening 17c for the insertion of the resilient end 43 of the contact spring 37. On the edge side of this opening 17c, a protective wall 48c with an essentially U-shaped outline can in turn lead from the brush carrying plate 17b. In addition, a ramp 50 is also provided in the protective wall 48c. The ramp 50 has its greatest dimension toward a free end 51 of the protective wall 48c. The ramp 51 extends at an angle to the longitudinal axis of the electric motor housing 10. This has the intentional effect that after the insertion of the resilient end 43 of the contact spring 37b through the opening 17c, the section 44 of the contact spring 37b comes into alignment with the ramp 50 and thereby is supported in the direction of the electric motor housing 10. As a result, a high contact force is produced at the resilient end 43 without the contact spring 37b being disadvantageously bent in the vicinity of the strip 49, i.e. close to the printed circuit board 33b.

It is clear from the three exemplary embodiments that there are different possibilities for embodying a contact spring with a resilient end 43 and electrically connecting it to interference suppression means for the purpose of including the metallic electric motor housing 10 in the interference suppression means for the interference suppression.

The foregoing relates to a preferred exemplary embodiments of the invention, it being understood that other variants and embodiments thereof are possible within the spirit and scope of the invention, the latter being defined by the appended claims.

I claim:

1. An actuating drive with an electric motor, comprising a metallic electric motor housing, a shaft with an armature and collector, brushes, and a brush carrying plate, and control electronics for the electric motor, a printed circuit board, electronic and electric components are connected to the printed circuit board and the printed circuit board protrudes at right angles to the shaft and, adjacent to the brush carrier plate the printed circuit board protrudes radially into a cross section of the electric motor housing, and outside the electric motor housing, in a radial direction, the printed circuit board has a portion which is protected by a control electronics housing, a strip conductor (41), which is contacted by a radio interference suppression means (55) and extends radially into the cross section of the electric motor housing, is contacted by a contact spring (37, 37a, 37b), wherein the contact spring (37, 37a, 37b) protrudes from the printed circuit board (33, 33b) toward the electric motor housing (10) and has a resilient end (43) that rests against the electric motor housing (10) in a resilient fashion.

2. The actuating drive according to claim 1, in which the brush carrying plate (17, 17a, 17b) is disposed axially between the printed circuit board (33, 33b) and the armature (13) and the contact spring (37, 37a, 37b) is inserted through the brush carrying plate (17, 17a, 17b).

3. The actuating drive according to claim 2, in which the brush carrying plate (17) is an injection-molded piece made of insulating material and that the contact spring (37) is embodied in a form of a leaf spring and is encompassed by the insulating material in a materially adhesive fashion.

4. The actuating drive according to claim 2, in which the brush carrying plate (17a) is made of an insulating material and has a conduit (45) through which the contact spring (37a) is slid.

5. The actuating drive according to claim 4, in which the contact spring (37a) has at least one securing tab (46, 47) directed against the brush carrying plate (17a).

6. The actuating drive according to claim 2, in which in a vicinity of a resilient end (43), the contact spring has a section (44) essentially bent in a U-shape, wherein the resilient end (43) adjoins the section (44) radially outward in relation to the electric motor housing (10).

7. The actuating drive according to claim 6, in which a protective wall (48) with an essentially U-shaped outline opening toward the resilient end (43) is formed onto the brush carrying plate (17, 17a, 17b) and leads from the brush carrying plate (17, 17a, 17b) and thereby along the contact spring (37, 37a, 37b).

8. The actuating drive according to claim 7, in which a ramp (50) is disposed in a vicinity of a free end (51) of a protective wall (48) and a smallest distance relative to an inside of the electric motor housing (10) is provided at the free end (51) of the protective wall (48).

9. The actuating drive according to claim 1, in which the contact spring (37b) has at least two soldering tabs (39b, 39c) both of which are slid through the printed circuit board (33b), are spaced a distance from each other, and are aligned essentially radially to the electric motor housing (10).

10. The actuating drive according to claim 9, in which at least one soldering tab (39c) extends from a strip (49) protruding at an angle from the contact spring (37b).

11. An actuating drive with an electric motor, comprising a metallic electric motor housing having two ends and a circumferential side, a shaft with an armature and collector and wherein one end of the shaft protrudes from one end of the motor housing, brushes, and a brush carrying plate, and control electronics for the electric motor, a printed circuit board, electronic and electric components are connected to the printed circuit board, the printed circuit board is housed within and protected by a control electronics housing which is positioned adjacent the circumferential side of the motor housing, and the printed circuit board protrudes from the control electronics housing into the motor housing at right angles to the shaft and adjacent to the brush carrier plate, a strip conductor (41), which is contacted by a radio interference suppression means (55) and extends into the cross section of the electric motor housing, is contacted by a contact spring (37, 37a, 37b), wherein the contact spring (37, 37a, 37b) protrudes from the printed circuit board (33, 33b) toward the electric motor housing (10) and has a resilient end (43) that rests against the electric motor housing (10) in a resilient fashion.

* * * * *